United States Patent
Yamamoto et al.

(10) Patent No.: US 10,562,184 B2
(45) Date of Patent: Feb. 18, 2020

(54) MOBILE ROBOT, MOVEMENT CONTROL SYSTEM, AND MOVEMENT CONTROL METHOD

(71) Applicant: FUJI XEROX CO., LTD., Tokyo (JP)

(72) Inventors: Kunitoshi Yamamoto, Kanagawa (JP); Hajime Kajiyama, Kanagawa (JP); Naoya Ogata, Kanagawa (JP); Hideki Fujimoto, Kanagawa (JP); Mariko Miyazaki, Kanagawa (JP); Toshihiko Shibusawa, Kanagawa (JP); Masatoshi Maruo, Kanagawa (JP); Hirokazu Tsubota, Kanagawa (JP); Yasuharu Sakurai, Kanagawa (JP); Tetsuya Kobayashi, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 164 days.

(21) Appl. No.: 15/448,147

(22) Filed: Mar. 2, 2017

(65) Prior Publication Data

US 2018/0009108 A1    Jan. 11, 2018

(30) Foreign Application Priority Data

Jul. 5, 2016    (JP) .............................. 2016-0133233

(51) Int. Cl.
| | | |
|---|---|---|
| *G06F 19/00* | (2018.01) | |
| *B25J 9/16* | (2006.01) | |
| *G05D 1/00* | (2006.01) | |
| *G06Q 50/12* | (2012.01) | |
| *G01C 21/20* | (2006.01) | |
| *G01C 21/00* | (2006.01) | |

(52) U.S. Cl.
CPC .......... *B25J 9/1664* (2013.01); *G01C 21/206* (2013.01); *G05D 1/0044* (2013.01); *G06Q 50/12* (2013.01); *G01C 21/00* (2013.01); *G05D 2201/0211* (2013.01); *Y10S 901/01* (2013.01)

(58) Field of Classification Search
CPC ....... B25J 9/1664; G01C 21/00; G06Q 50/12; G05D 1/0044; G05D 2201/0211; Y10S 901/01
See application file for complete search history.

(56) References Cited

U.S. PATENT DOCUMENTS

| | | | | |
|---|---|---|---|---|
| 9,517,559 B2* | 12/2016 | Kawabe | ............... | B25J 11/0005 |
| 2005/0222712 A1* | 10/2005 | Orita | ..................... | G06Q 30/02 |
| | | | | 700/246 |
| 2005/0267633 A1* | 12/2005 | Waita | ..................... | G06Q 30/06 |
| | | | | 700/245 |
| 2006/0004487 A1* | 1/2006 | Sugiyama | ............. | B60R 25/257 |
| | | | | 700/245 |
| 2006/0004488 A1* | 1/2006 | Sugiyama | ............. | G06Q 30/02 |
| | | | | 700/245 |

(Continued)

FOREIGN PATENT DOCUMENTS

| | | |
|---|---|---|
| JP | 2014-209293 A | 11/2014 |
| JP | 2016-085174 A | 5/2016 |

*Primary Examiner* — Ian Jen
(74) *Attorney, Agent, or Firm* — Oliff PLC

(57) ABSTRACT

A mobile robot includes a receiving unit that receives designation of a destination region including a destination, a moving unit that moves toward the destination region, and a seeking unit that seeks a client after movement toward the destination region starts. The moving unit moves toward the sought client.

15 Claims, 15 Drawing Sheets

(56) References Cited

U.S. PATENT DOCUMENTS

| | | | |
|---|---|---|---|
| 2008/0109114 A1* | 5/2008 | Orita | B25J 19/005 |
| | | | 700/248 |
| 2014/0309835 A1* | 10/2014 | Yamamoto | G05D 1/0217 |
| | | | 701/25 |
| 2015/0026708 A1* | 1/2015 | Ahmed | H04N 5/23206 |
| | | | 725/12 |

* cited by examiner

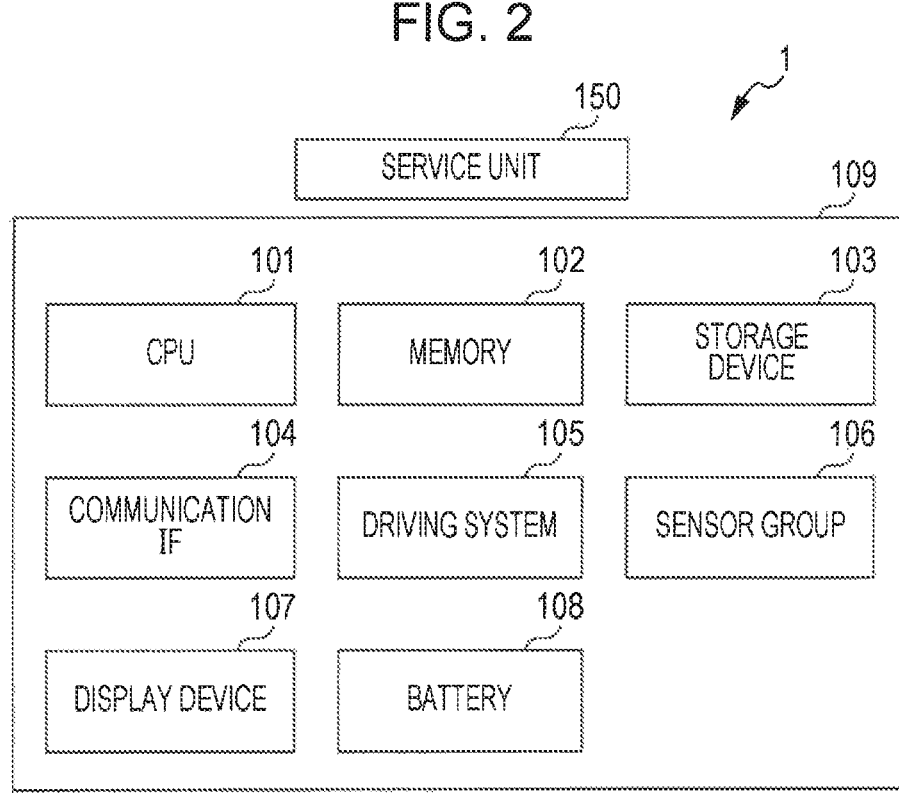
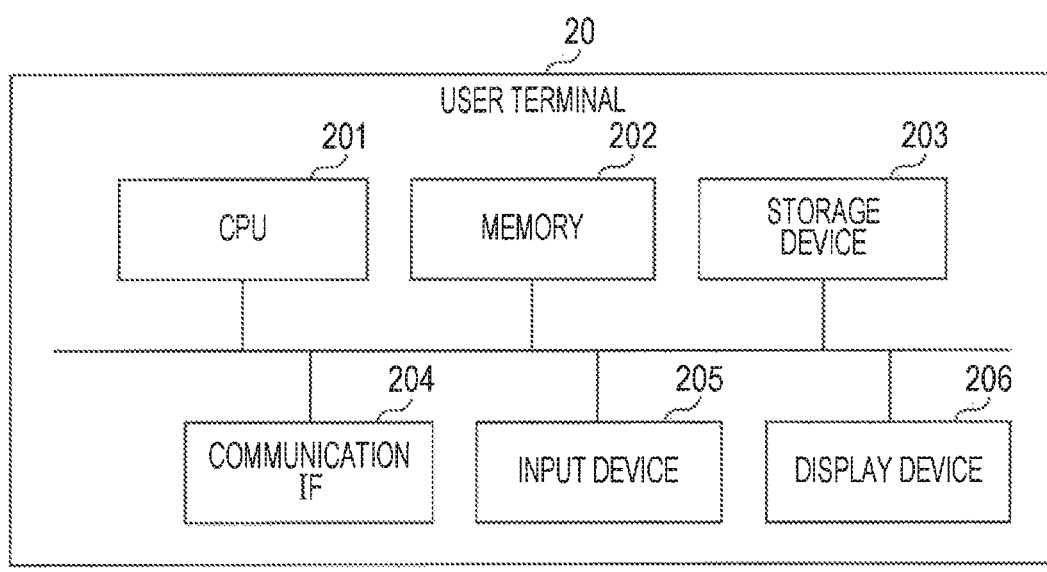

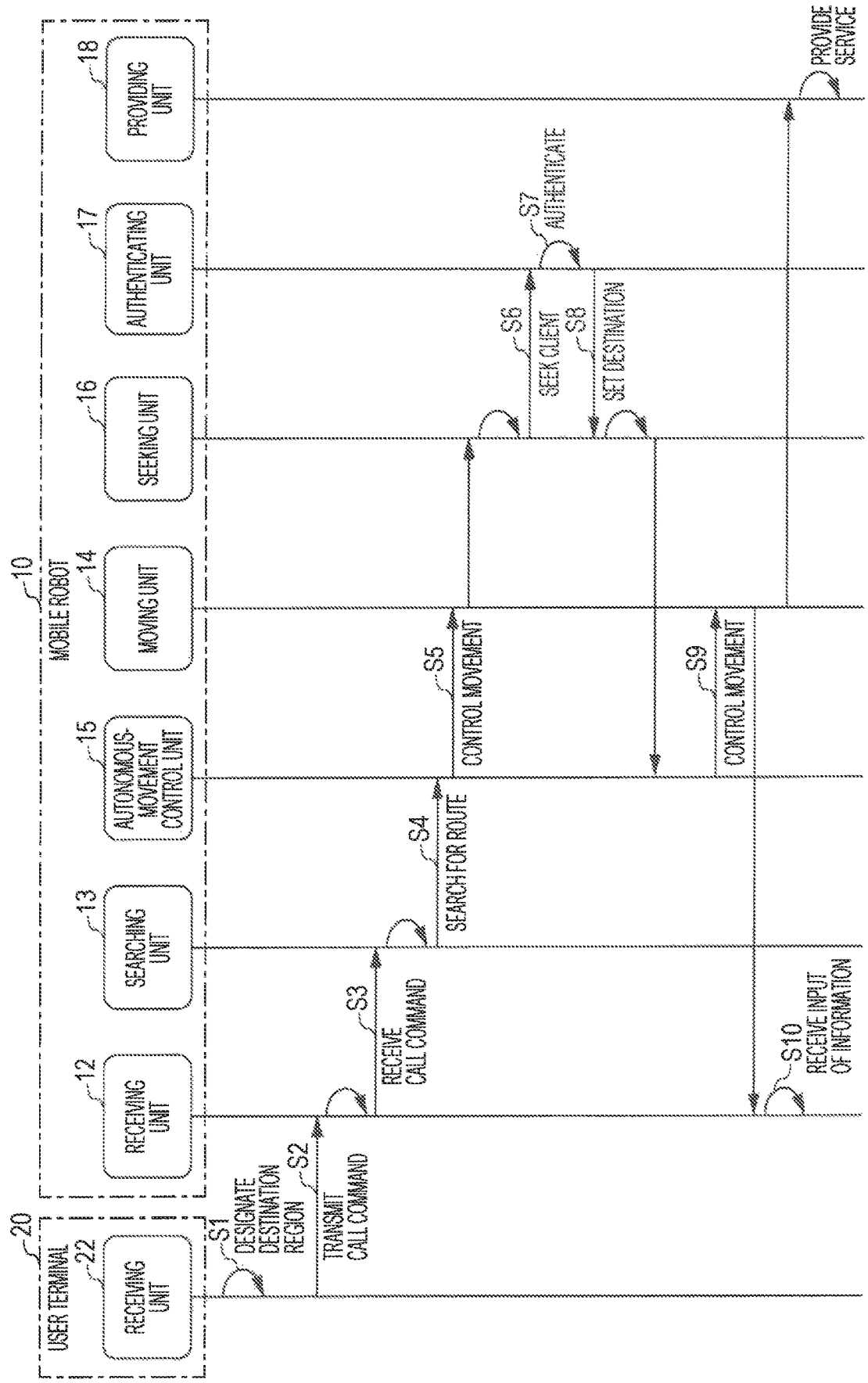

US 10,562,184 B2

MOBILE ROBOT, MOVEMENT CONTROL SYSTEM, AND MOVEMENT CONTROL METHOD

CROSS-REFERENCE TO RELATED APPLICATIONS

This application is based on and claims priority under 35 USC 119 from Japanese Patent Application No. 2016-133233 filed Jul. 5, 2016.

BACKGROUND

Technical Field

The present invention relates to mobile robots, movement control systems, and movement control methods.

SUMMARY

According to an aspect of the invention, there is provided a mobile robot including a receiving unit that receives designation of a destination region including a destination, a moving unit that moves toward the destination region, and a seeking unit that seeks a client after movement toward the destination region starts. The moving unit moves toward the sought client.

BRIEF DESCRIPTION OF THE DRAWINGS

An exemplary embodiment of the present invention will be described in detail based on the following figures, wherein:

FIG. 2 illustrates a hardware configuration of a mobile robot;

FIG. 3 illustrates a hardware configuration of a user terminal;

FIG. 4 is a sequence chart schematically illustrating the operation of the movement control system;

DETAILED DESCRIPTION

1. Configuration

Figure 1:
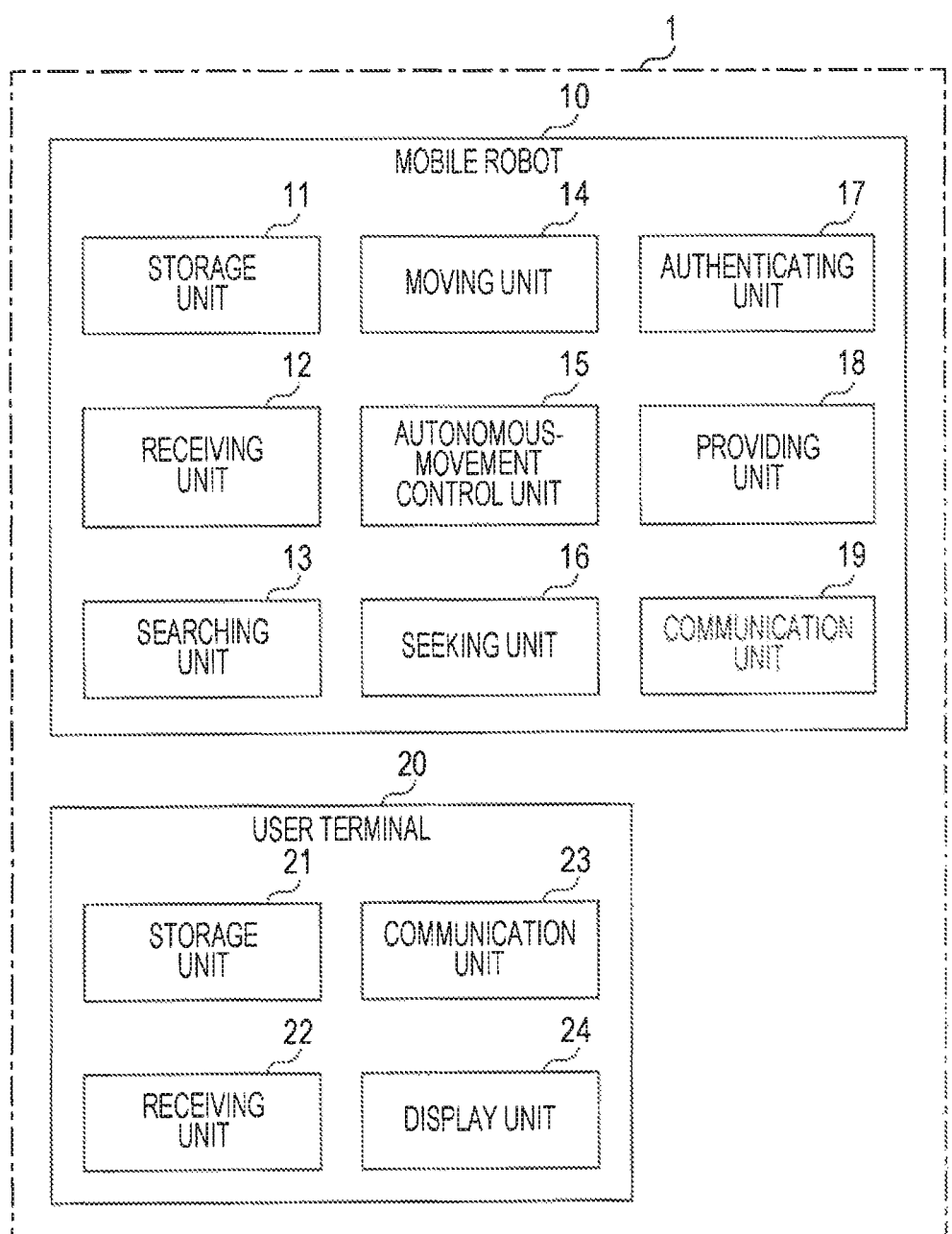
FIG. 1 illustrates a functional configuration of a movement control system according to an exemplary embodiment.

FIG. 1 illustrates a functional configuration of a movement control system 1 according to an exemplary embodiment. The movement control system 1 includes a mobile robot 10. The mobile robot 10 is a device that moves autonomously. The mobile robot 10 moves by, for example, autonomously determining a route to a client so as to provide a service thereto. The mobile robot 10 may have any shape so long as it moves autonomously. For example, the mobile robot 10 may have a human-like shape or may have a shape different from a human-like shape. Examples of services to be provided include providing a beverage (such as coffee or tea) and providing a light meal (such as a snack). Although there are various methods for designating a destination for the mobile robot 10, the methods have the following problems.

A first problem occurs when a destination is designated by using a map displayed on a user terminal (e.g., a smartphone). In this case, since the display screen of the user terminal is small, it is difficult to display a detailed map, thus making it difficult to specify a specific destination on the map. Although it is possible to designate a specific destination by expanding the map, an operation for expanding the map is necessary and is troublesome.

A second problem occurs when a client commands the mobile robot 10 to come over but the location of the client changes before the mobile robot 10 arrives. Since the final destination is not confirmed at the time when the mobile robot 10 starts moving, it is difficult to specify a specific destination.

A third problem occurs when the user who has commanded the mobile robot 10 to move and the user who is to actually receive the service are different from each other (e.g., when a client requests that coffee be provided to his/her boss). In the first place, the user commanding the mobile robot 10 to move is sometimes not aware of the accurate location of the user receiving the service, thus making it difficult to specify a specific location.

In order to cope with the first to third problems described above, the mobile robot 10 according to this exemplary embodiment first sets a region having a surface area larger than a predetermined threshold value as a destination region (an example of a first goal) and then sets a specific location of a person who is to receive the service (simply referred to as "client" hereinafter) as a destination (an example of a second goal) after the mobile robot 10 starts moving toward the destination region.

In this example, the movement control system 1 further includes a user terminal 20. The user terminal 20 is a device that receives designation of a destination region from a user and transmits the received destination region to the mobile robot 10.

The movement control system 1 has a storage unit 11, a receiving unit 12, a searching unit 13, a moving unit 14, an autonomous-movement control unit 15, a seeking unit 16, an authenticating unit 17, a providing unit 18, a communication unit 19, a storage unit 21, a receiving unit 22, a communication unit 23, and a display unit 24. In this example, the storage unit 11, the receiving unit 12, the searching unit 13, the moving unit 14, the autonomous-movement control unit 15, the seeking unit 16, the authenticating unit 17, the providing unit 18, and the communication unit 19 are implemented in the mobile robot 10, and the storage unit 21, the receiving unit 22, the communication unit 23, and the display unit 24 are implemented in the user terminal 20.

The storage unit 21 of the user terminal 20 stores map data therein. The map data indicates a map of a range in which the mobile robot 10 is movable. The receiving unit 22 receives designation of a destination region. The destination region is a region including a destination. The communication unit 23 communicates with the mobile robot 10. In this example, the communication unit 23 transmits information for specifying the destination region received by the receiving unit 22 to the mobile robot 10. The display unit 24 displays information, such as the map.

The communication unit 19 of the mobile robot 10 communicates with the user terminal 20. The storage unit 11 stores map data therein. The map data indicates a map of a range in which the mobile robot 10 is movable. In this example, the map data stored in the storage unit 11 and the map data stored in the storage unit 21 are synchronized. The receiving unit 12 receives designation of a destination region, which is a region including a destination. In this example, reception of information transmitted from the user terminal 20 by the receiving unit 12 (i.e., information for specifying the destination region received by the receiving unit 22) corresponds to reception of designation of a destination region. The searching unit 13 searches for a route toward the destination region. In this example, the searching unit 13 searches for the route by referring to the map data stored in the storage unit 11.

The moving unit 14 causes the mobile robot 10 to move. The autonomous-movement control unit 15 controls the moving unit 14 for autonomous movement of the mobile robot 10. The term "autonomous movement" refers to movement of the robot itself based on its own decision without any specific human command. In this example, the autonomous-movement control unit 15 controls the moving unit 14 so as to move toward the destination region. After the moving unit 14 starts moving toward the destination region, the seeking unit 16 seeks a client. In this example, the seeking unit 16 specifies a person giving a predetermined signal as a client candidate. The authenticating unit 17 authenticates whether the client candidate is the proper client. When the client candidate is authenticated, the seeking unit 16 specifies this client candidate as a client.

The providing unit 18 provides a predetermined service. The providing unit 18 may be configured to provide the service automatically (e.g., a robot that automatically pours coffee into a cup and automatically hands over the cup filled with the coffee to the client) or simply hold items to be provided for the service (e.g., a table having a coffee pot and cups accommodated therein).

FIG. 2 illustrates a hardware configuration of the mobile robot 10. The mobile robot 10 has a central processing unit (CPU) 101, a memory 102, storage device 103, a communication interface (IF) 104, a driving system 105, a sensor group 106, a display device 107, a battery 108, and a housing 109.

The CPU 101 is a processor that controls other components of the mobile robot 10. The memory 102 is a storage device functioning as a work area to be used by the CPU 101 for executing a program and includes, for example, a random access memory (RAM). The storage device 103 stores various types of programs and data therein and includes, for example, a solid state drive (SSD) or a hard disk drive (HDD). The communication IF 104 communicates with another device in accordance with a predetermined wireless or wired communication standard (e.g., Wi-Fi (registered trademark), Bluetooth (registered trademark), or Ethernet (registered trademark)).

The driving system 105 is a mechanism for moving the mobile robot 10 and includes, for example, multiple wheels, tires attached to these wheels, a motor for driving these wheels, and a mechanism for changing the direction of these wheels. The sensor group 106 is a sensor (i.e., an example of a detector) that detects various types of information used in autonomous movement, seeking of a client, or receiving of a command, and includes at least one of a time-of-flight (TOF) sensor, a stereo camera, a thermal image camera, a microphone, a moving-amount sensor, and an infrared sensor. The display device 107 displays various types of information and includes, for example, a liquid crystal display (LCD). The battery 108 is for supplying electric power for driving other components, such as the CPU 101 and the driving system 105, and is, for example, a lithium ion battery. The housing 109 accommodates and retains other components including from the CPU 101 to the battery 108.

In this example, the mobile robot 10 further has a service unit 150. The service unit 150 provides a service to a client and includes, for example, a coffee server or a snack box. The service unit 150 is connected to the housing 109.

Furthermore, in this example, the storage device 103 stores therein a program for controlling the driving system 105 so as to cause the mobile robot 10 to move autonomously (referred to as "autonomous movement program" hereinafter) and a program for setting a destination in accordance with a command from a user or the user terminal 20 (referred to as "movement control program" hereinafter). The CPU 101 executes these programs so that the functions shown in FIG. 1 are implemented in the mobile robot 10. The storage device 103 is an example of the storage unit 11. The CPU 101 executing the movement control program is an example of the receiving unit 12, the searching unit 13, the seeking unit 16, and the authenticating unit 17. The driving system 105 is an example of the moving unit 14. The CPU 101 executing the autonomous movement program is an example of the autonomous-movement control unit 15. The service unit 150 is an example of the providing unit 18. The communication IF 104 is an example of the communication unit 19.

Furthermore, in this example, the storage device 103 stores map data indicating a region in which the mobile robot 10 is movable. The autonomous movement program and the movement control program refer to this map data so as to perform an autonomous movement process and a destination setting process.

FIG. 3 illustrates a hardware configuration of the user terminal 20. The user terminal 20 is a computer having a CPU 201, a memory 202, a storage device 203, a communication IF 204, an input device 205, and a display device 206 and is, for example, a mobile terminal or a personal computer (PC). The CPU 201 is a processor that controls other components of the user terminal 20. The memory 202 is a storage device functioning as a work area to be used by the CPU 201 for executing a program and includes, for example, a RAM. The storage device 203 stores various types of programs and data therein and includes, for example, an SSD. The communication IF 204 communicates with another device (i.e., the mobile robot 10 in this example) in accordance with a predetermined wireless or wired communication standard. The input device 205 is used by a user for inputting a command or information to the user terminal 20 and includes, for example, at mast one of a touchscreen, a keypad, and a microphone. The display device 206 displays various types of information and includes, for example, an LCD.

In this example, the storage device 203 stores a program for causing the computer to function as a user terminal in the movement control system 1 (referred to as "client program" hereinafter). The CPU 201 executes this program so that the functions shown in FIG. 1 are implemented in the user terminal 20. The storage device 203 is an example of the storage unit 21. The CPU 201 executing the client program is an example of the receiving unit 22. The communication IF 204 is an example of the communication unit 23. The display device 206 is an example of the display unit 24.

Furthermore, in this example, the storage device 203 stores map data indicating a region in which the mobile robot 10 is movable. The client program refers to this map data so as to receive designation of a destination region. The map data stored in the storage device 203 and the map data stored in the storage device 103 are synchronized at a predetermined timing. The term "predetermined timing" refers to, for example, a time point when a communication connection between the user terminal 20 and the mobile robot 10 is established or when a predetermined period has elapsed from the previous synchronization.

2. Operation

FIG. 4 is a sequence chart schematically illustrating the operation of the movement control system 1. The flow in FIG. 4 commences when, for example, the client program is activated in the user terminal 20 and a communication connection with the user terminal 20 is established. Although the process described below is principally performed by functional components, such as the receiving unit 22, the hardware components and the software components corresponding to the functional components operate in cooperation with each other to execute the process.

In step S1, the receiving unit 22 of the user terminal 20 receives designation of a designation region by a user. In step S2, the receiving unit 22 transmits a call command to the mobile robot 10. In step S3, the receiving unit 12 of the mobile robot 10 receives the call command from the user terminal 20 (i.e., receives the call command). In step S4, the searching unit 13 searches for a route to the destination region. In step S5, the autonomous-movement control unit 15 controls the moving unit 14 so as to move toward the destination region. In step S6, the seeking unit 16 seeks a client. In step S7, the authenticating unit 17 authenticates the client. In step S8, the seeking unit 16 sets a specific destination. In step S9, the autonomous-movement control unit 15 controls the moving unit 14 so as to move toward the destination. In step S10, the receiving unit 12 receives an input of information related to a service to be provided. After the destination is reached, the providing unit 18 provides the service. The steps will be described in detail below.

Figure 5:
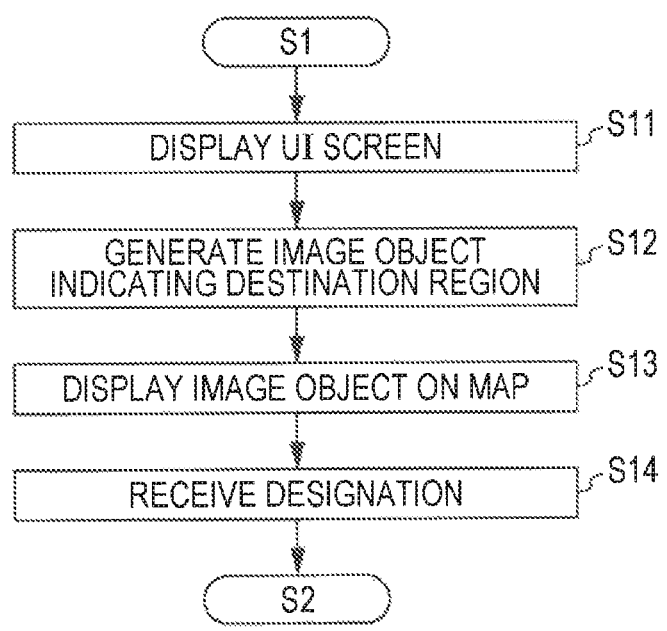
FIG. 5 is a flowchart illustrating a detailed example of step S1.

FIG. 5 is a flowchart illustrating a detailed example of step S1. In step S11, the receiving unit 22 displays a user-interface (UI) screen that receives the designation of the destination region related to the call command.

Figure 6:
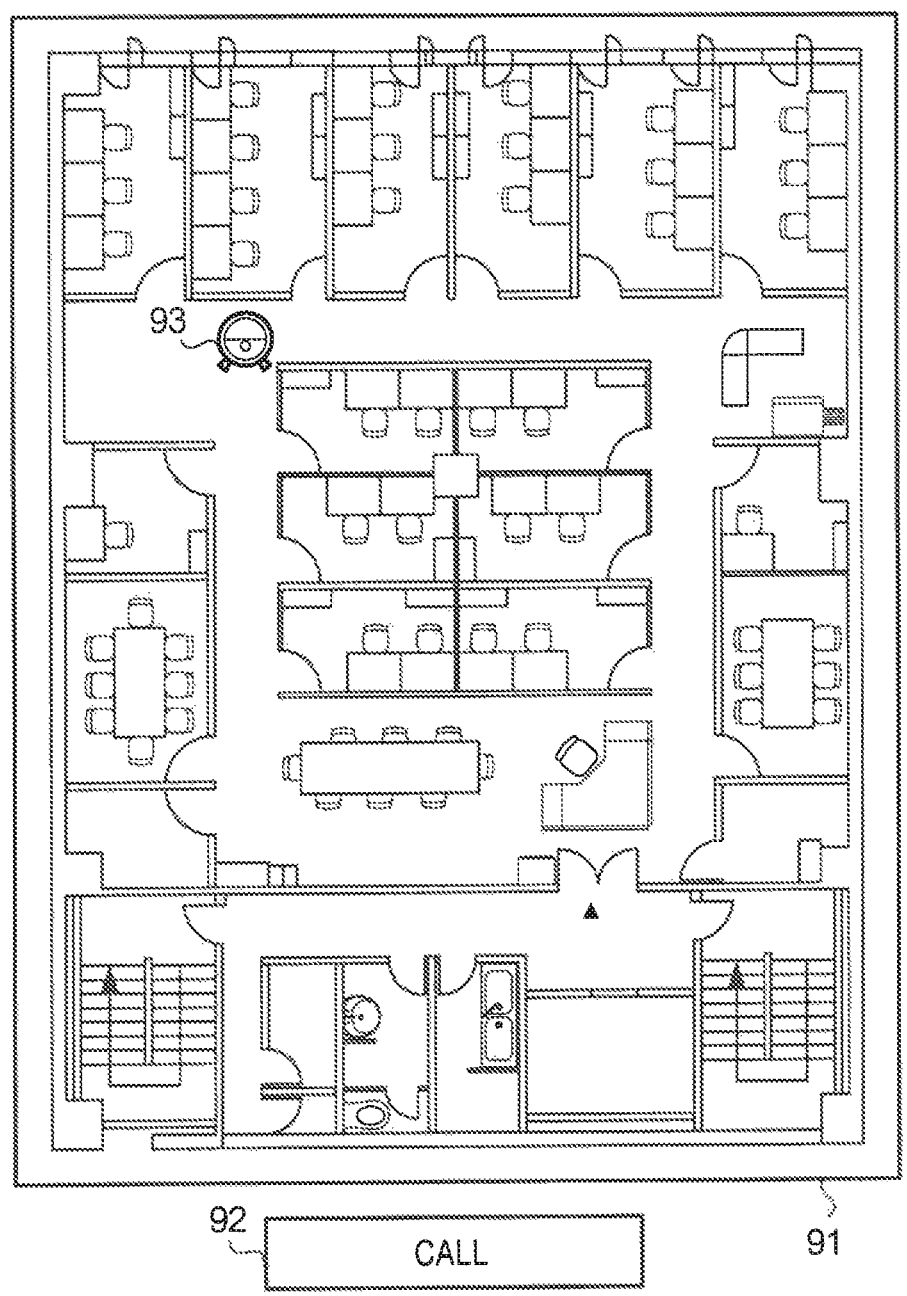
FIG. 6 illustrates an example of a user-interface (UI) screen that receives designation of a destination region.

FIG. 6 illustrates an example of the UI screen that receives the designation of the destination region. This UI screen includes a region 91 and a button 92. The region 91 displays a map. This map is displayed in accordance with the map data stored in the storage unit 21 and shows a spatial region in which the mobile robot 10 is movable. For example, in a case where the mobile robot 10 is used only on a specific floor of a specific building, the map data is sufficient so long as it contains only the information about this specific floor. The map data contains information for specifying the position and the size of the region in which the mobile robot 10 is actually movable (referred to as "movable region" hereinafter). The term "movable region" refers to, for example, a region set as a passage and is, for example, a region having no furniture (e.g., desks or shelves) disposed therein if inside a room, or a region having no structures that are difficult to move (e.g., stairs or steps). The map data may further contain information for specifying obstacles (e.g., plant pots or temporarily-placed baggage) placed in the passage. The button 92 is a UI component used for inputting a command for calling the mobile robot 10, that is, a UI component used for inputting a command for transmitting the destination region to the mobile robot 10.

In the region 91, an object 93 is displayed on the map. The object 93 is an image object indicating the location of the mobile robot 10. The mobile robot 10 uses the information detected by the sensor group 106 so as to calculate its own location on the map. The user terminal 20 acquires the information indicating the location of the mobile robot 10 (simply referred to as "locational information" hereinafter) via the communication connection with the mobile robot 10. The display unit 24 uses the map data stored in the storage unit 21 and the locational information acquired from the mobile robot 10 so as to display the UI screen shown in FIG. 6.

If there are multiple mobile robots included in the movement control system 1, the display unit 24 displays multiple image objects indicating the locations of the multiple mobile robots on the map. The user selects a mobile robot, to which a call command is to be transmitted, by, for example, touching one of the multiple image objects.

Figure 7:
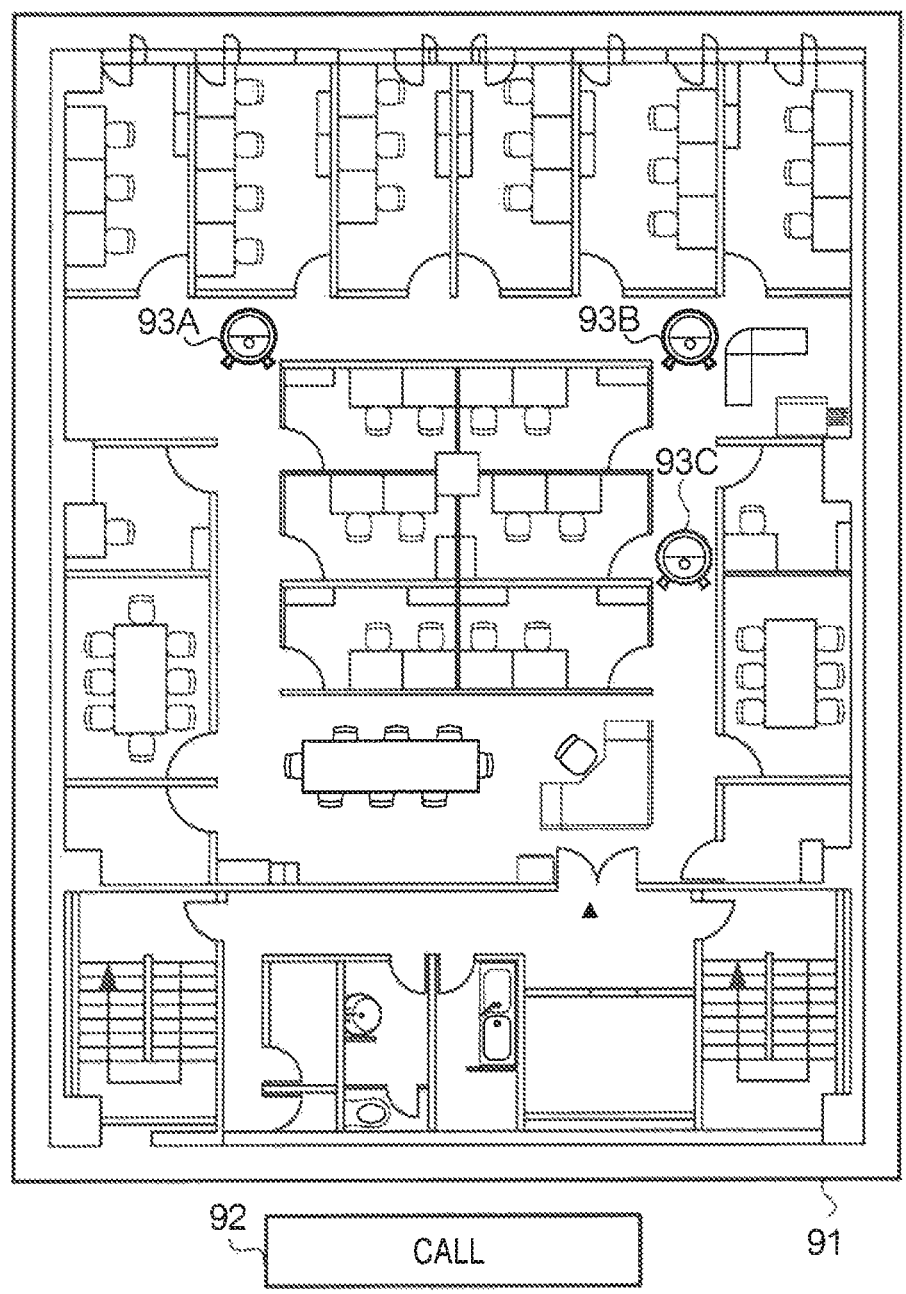
FIG. 7 illustrates an example of a UI screen used for robot selection.

FIG. 7 illustrates an example of a UI screen used for robot selection, in this example, the movement control system 1 includes three mobile robots. The locations of these three mobile robots are indicated by image objects 93A, 93B, and 93C on the map. The three mobile robots provide different services. For example, the image object 93A indicates a mobile robot that provides coffee, the image object 93B indicates a mobile robot that provides snacks, and the image object 93C indicates a mobile robot that performs cleaning. The image objects 93A, 93B, and 93C have external appearances based on which their services to be provided are visually recognizable. For example, the image objects 93A, 93B, and 93C are individually given predetermined colors (e.g., black for coffee, red for snacks, and blue for cleaning). In a case where usable services are limited from user to user, the UI screen displayed on the user terminal 20 of a certain user only displays the image object or objects indicating the location or locations of the mobile robot or robots 10 usable by that user. For example, for a user who is only allowed to use the coffee-providing service but is not allowed to use the snack-providing service and the cleaning service, the UI screen displayed on the user terminal 20 of that user displays only the image object 93A but not the image objects 93B and 93C. In this example, usability and non-usability of each service are determined in the user terminal 20 or in each mobile robot 10. In either case, user authentication, such as a log-in process, is performed in the user terminal 20. On this UI screen, information related to each mobile robot may also be displayed on the map. The term "information related to a mobile robot" refers to, for example, the waiting time until the service is provided, the operating status of the mobile robot (e.g., in-operation status or under-maintenance status), and the usage fee (in the case of a fee-based service).

Referring back to FIG. 4, in step S12, the receiving unit 22 generates an image object indicating the destination region in accordance with the command from the user. In step S13, the display unit 24 displays the generated image object on the map. In step S14, the receiving unit 22 receives the designation of the destination region.

Figure 8:
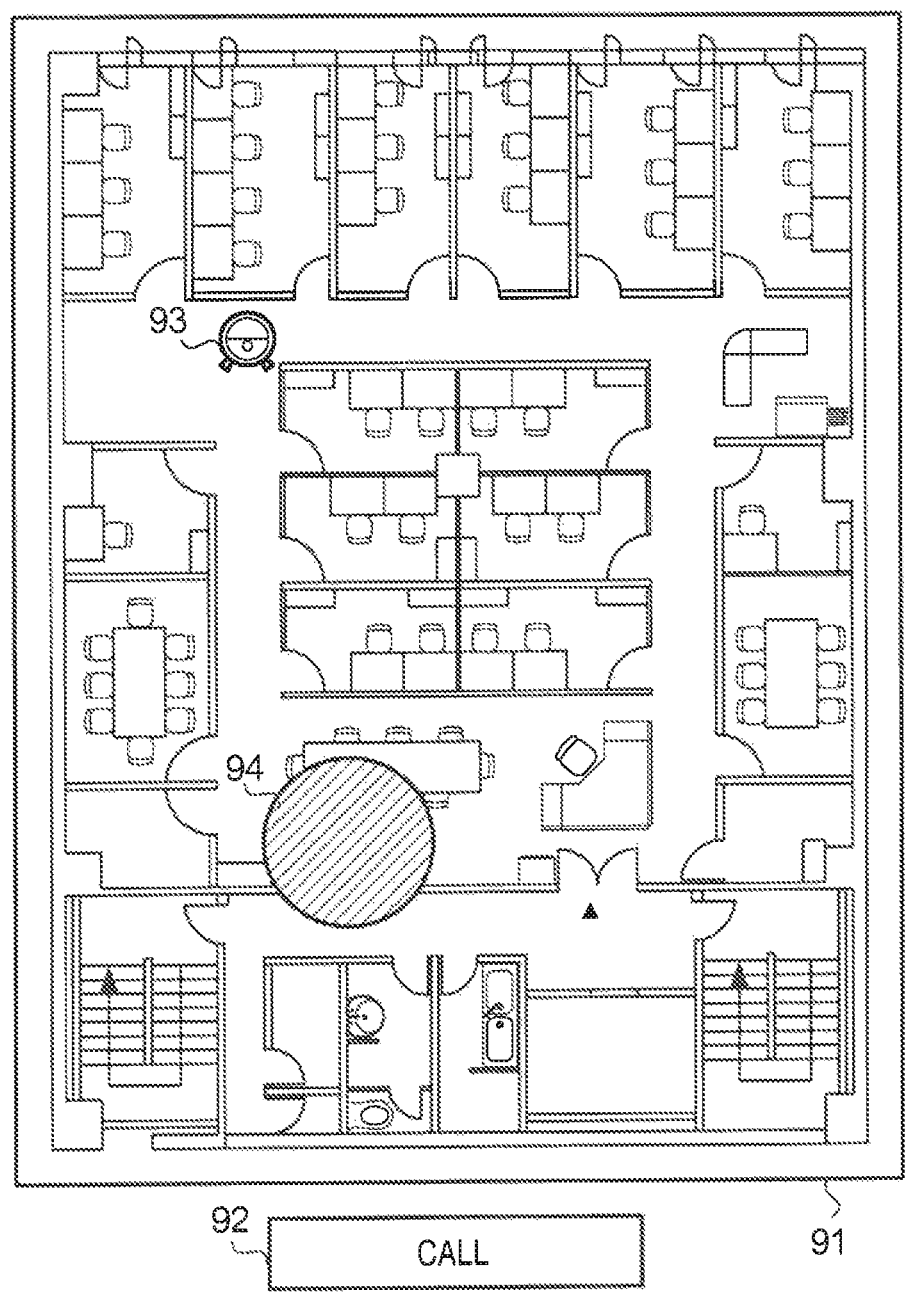
FIG. 8 illustrates an example of an image object indicating the destination region.

FIG. 8 illustrates an example of the image object indicating the destination region. In this example, the user terminal 20 has a touchscreen serving as the input device 205 and the display device 206. The receiving unit 22 receives the designation of the destination region in accordance with the position on the screen touched by the user. This will be described in detail below.

The receiving unit 22 acquires the coordinates of the position on the touchscreen touched by the user (referred to as "designated position" hereinafter). The receiving unit 22 generates a circular image object centered on the designated position and having a predetermined radius. This radius may be set in accordance with the physical size of the touchscreen (e.g., a radius of 100 as a coordinate value) or may be set in accordance with the scale of the displayed map (e.g., a radius of 5 m as a dimension on the map). This image object indicates the destination region. The display unit 24 displays the image object generated by the receiving unit 22 (i.e., an object 94 in FIG. 8).

Referring back to FIG. 5, when the user touches the position corresponding to the button 92, the receiving unit 22 transmits a call command to the mobile robot 10 in step S2. This call command includes information for specifying the destination region and information for specifying the user. The information for specifying the destination region includes, for example, the coordinates of a representative point and the radius of the destination region on the map. The representative point is, for example, the center of the circle. In another example, if the destination region is rectangular, the representative point corresponds to the coordinates of two apexes on a diagonal line. In this example, the user preliminarily registers his/her own information so that a user ID is given to the user or the user terminal 20. The receiving unit 22 transmits this user ID as the information for specifying the user.

In step S3, the receiving unit 12 of the mobile robot 10 receives the call command from the user terminal 20. The receiving unit 12 stores the coordinates of the destination region and the user ID included in the call command into the storage unit 11. The storage unit 11 stores the coordinates of the destination region and the user ID based on a first-in first-out (FIFO) method.

Figure 9:
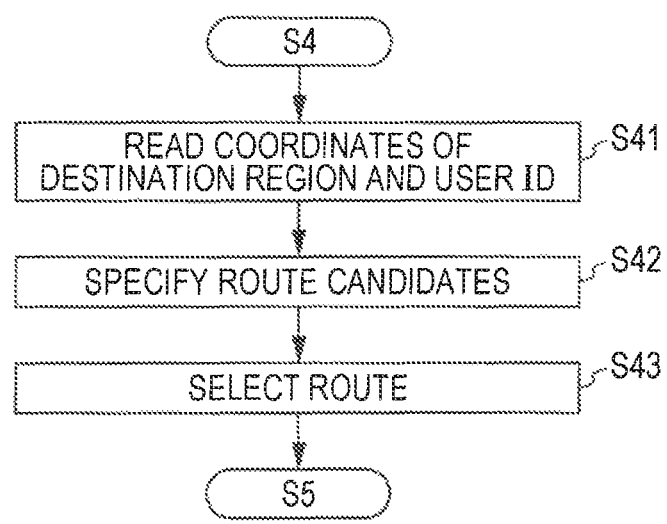
FIG. 9 is a flowchart illustrating a detailed example of step S4.

FIG. 9 is a flowchart illustrating a detailed example of step S4. In step S41, the searching unit 13 reads the coordinates of the destination region and the user ID from the storage unit 11. In step S42, the searching unit 13 specifies route candidates to the destination region. In step S43, the searching unit 13 selects one route from the route candidates.

Figure 10:
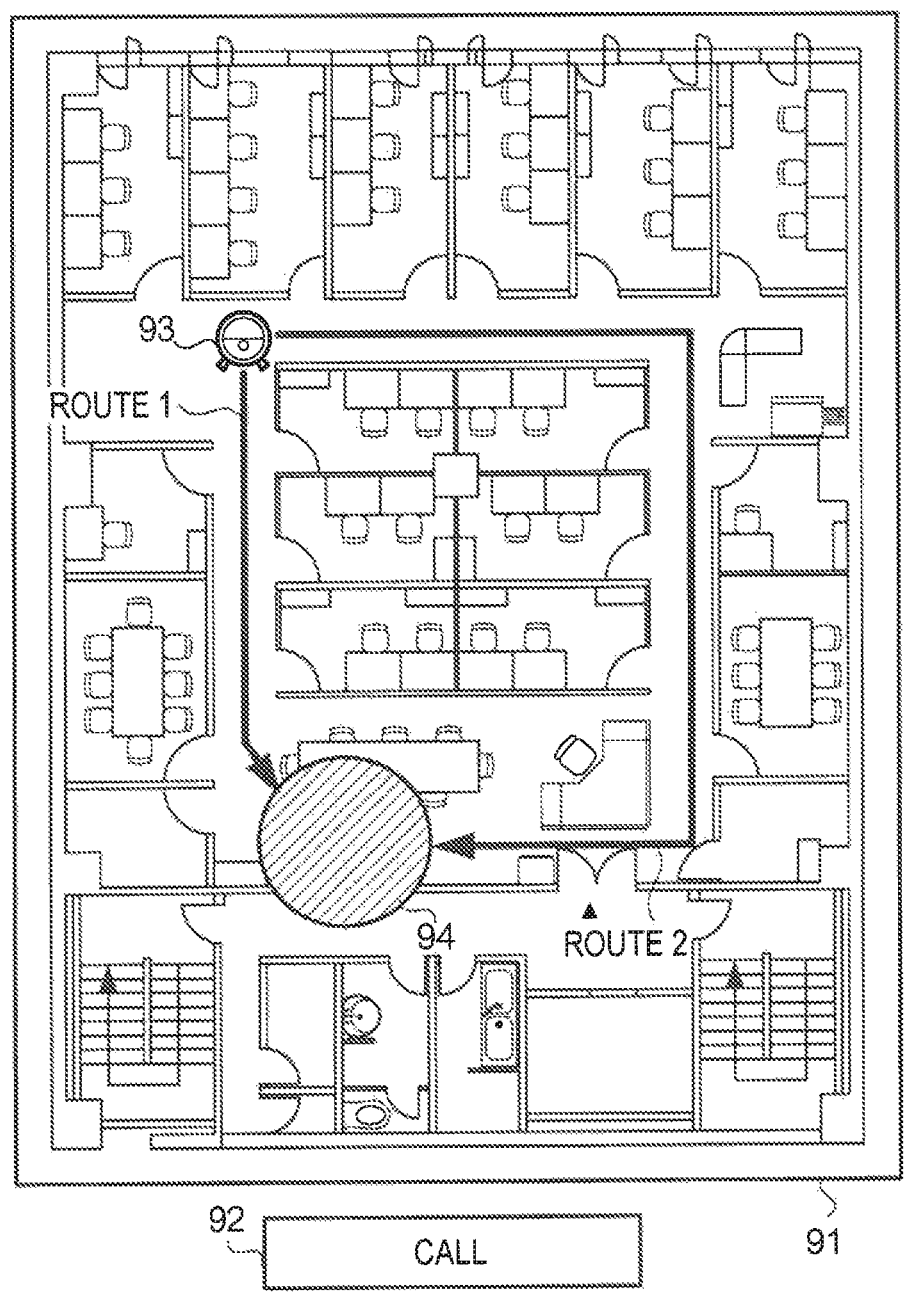
FIG. 10 illustrates an example of a route searching process in step S4.

FIG. 10 illustrates an example of a route searching process in step S4. In this example, the searching unit 13 searches for the shortest route from the current location of the mobile robot 10 to the destination region. The term "shortest route" refers to a route the distance of which from the current location of the mobile robot 10 to the outer periphery of the destination region is the shortest. In this example, the searching unit 13 first specifies two routes, namely, route 1 and route 2, as the route candidates. A known algorithm is used for specifying the route candidates from the departure point to the destination point. Subsequently, for each of the multiple specified route candidates, the searching unit 13 calculates the distance from the current location of the mobile robot 10 to the outer periphery of the destination region. The searching unit 13 selects, from the multiple route candidates, the route with the shortest distance. The searching unit 13 stores information for specifying the selected route and the user ID into the storage unit 11. This user ID is for specifying the user terminal from which the call command corresponding to this route is transmitted or for specifying the user thereof. Although routes are shown on the map for illustrative purposes, the routes are not displayed on the map displayed on the display unit 24 of the user terminal 20. Alternatively, the user terminal 20 may receive information for specifying a route from the mobile robot 10, and the display unit 24 may display this information.

Figure 11:
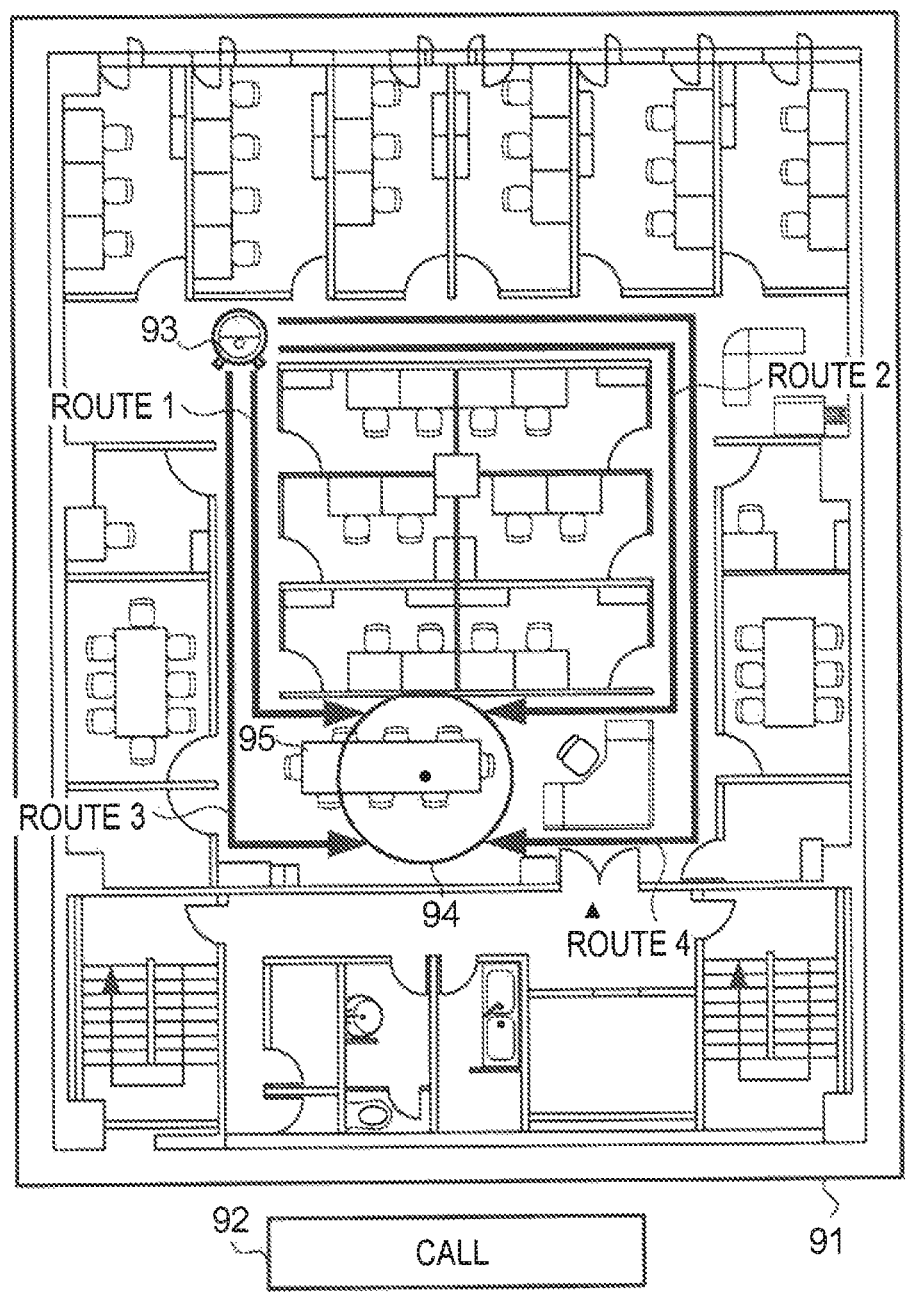
FIG. 11 illustrates another example of the route searching process in step S4.

FIG. 11 illustrates another example of the route searching process in step S4. In this example, the route searching process corresponds to a case where the destination region includes multiple movable regions (e.g., multiple passages). Specifically, if the destination region includes multiple movable regions, the searching unit 13 selects, from the multiple movable regions, a route that includes a region close to the center of the destination region. This will be described in further detail below. In this example, the route selected by the searching unit 13 is not necessarily the route with the shortest distance to the outer periphery, as illustrated in FIG. 10. Instead, a route not necessarily having the shortest distance to the outer periphery but passing through a region that overlaps a region close to the center of the destination region 94 is at least selected from the multiple movable regions. Furthermore, if there are multiple routes of this kind, the route with the shortest distance from the current location of the mobile robot 10 to the outer periphery is further selected from these routes. For example, in a case where the destination region covers two passages, if a route is selected as in the example in FIG. 10, there is a possibility that the mobile robot 10 may move to a location different from that desired by the user. For example, in a case where the user designates a destination region with the intention of setting a lower location relative to a desk 95 as the destination, if the destination region 94 includes both an upper passage and a lower passage relative to the desk 95 due to the relationship between the scale of the map and the size of the destination region, the mobile robot 10 may move to the upper passage of the desk 95, which is closer to the current location (i.e., the image object 93) of the mobile robot 10. This undesirably results in the mobile robot 10 moving to a location different from that desired by the user. In this example, a route that passes through a region that overlaps a region close to the center of the destination region 94 is at least selected from the multiple movable regions. Specifically, the searching unit 13 first specifies route candidates (i.e., routes 1 to 4 in FIG. 11) to the outer periphery of the destination region 94. From these route candidates, the searching unit 13 excludes routes (i.e., routes 1 and 2 in this example) that pass through a passage (i.e., the upper passage) that is far from the center of the destination region 94. Finally, from the route candidates (i.e., routes 3 and 4 in this example), the searching unit 13 selects the route (i.e., route 3 in this example) with the shortest moving distance from the current location of the mobile robot 10. According to this example, if the destination region 94 includes multiple movable regions, the moving unit 14 moves toward the region overlapping the region close to the center of the destination region 94 among the multiple movable regions.

Figure 12:
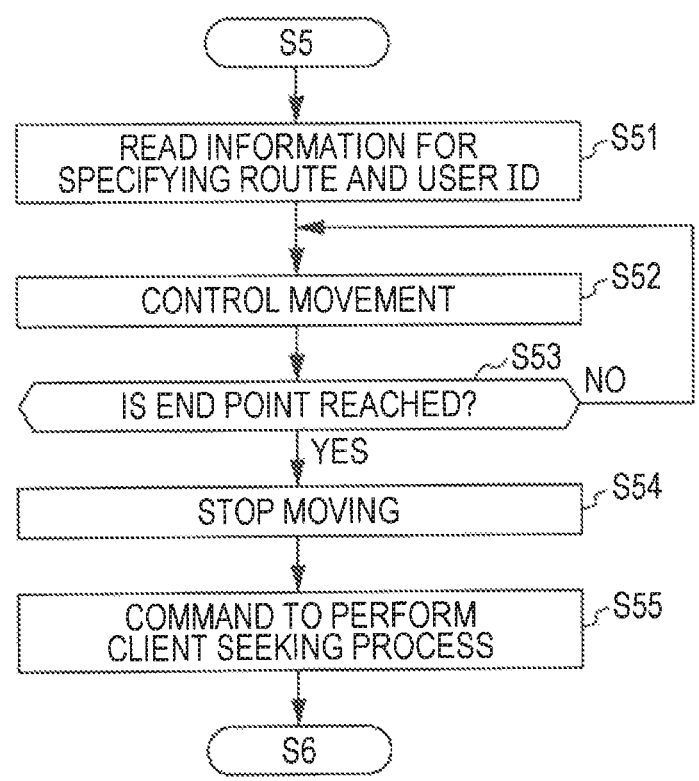
FIG. 12 is a flowchart illustrating a detailed example of movement control in step S5.

FIG. 12 is a flowchart illustrating a detailed example of step S5. In step S51, the autonomous-movement control unit 15 reads the information for specifying the route and the user ID from the storage unit 11. In step S52, the autonomous-movement control unit 15 controls the moving unit 14 so as to move along the read route. In step S53, the autonomous-movement control unit 15 determines whether the end point of the set route is reached. If it is determined that the end point is not reached (NO in step S53), the autonomous-movement control unit 15 causes the process to transfer to step S52. If it is determined that the end point is reached (YES in step S53), the autonomous-movement control unit 15 causes the process to transfer to step S54.

In step S54, the autonomous-movement control unit 15 controls the moving unit 14 so as to stop moving. In this example, step S6 to be described below (i.e., a client seeking process) is performed in the state where the movement has stopped. In step S55, the autonomous-movement control unit 15 commands the seeking unit 16 to perform the client seeking process.

Figure 13:
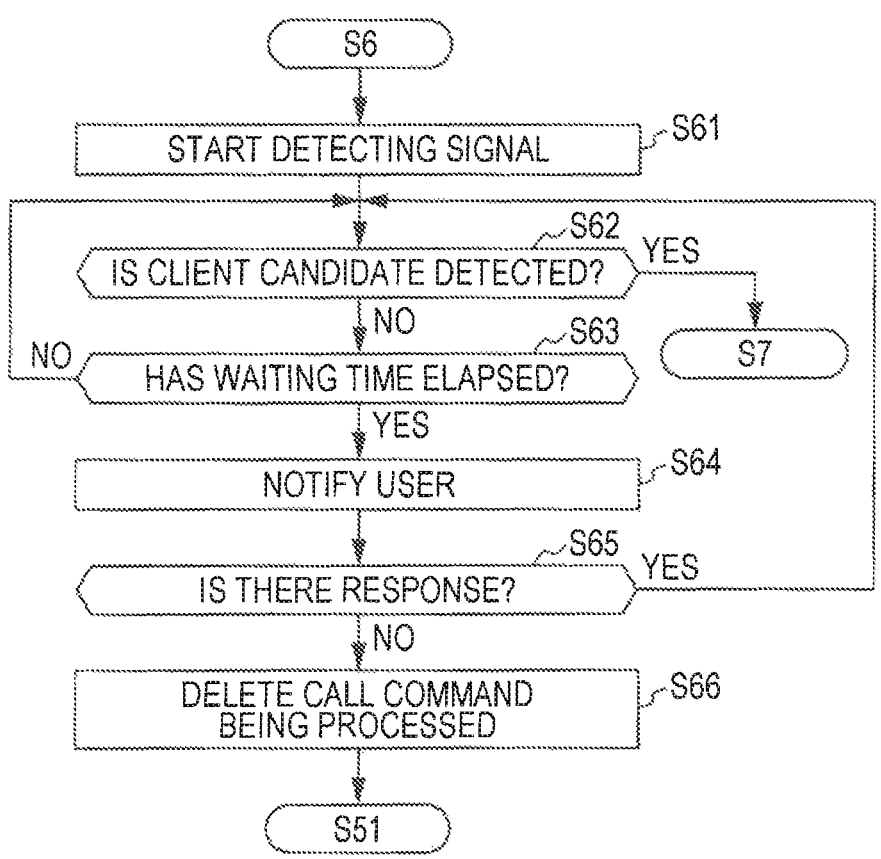
FIG. 13 is a diagram illustrating a detailed example of step S6.

FIG. 13 is a diagram illustrating a detailed example of step S6. In step S61, the seeking unit 16 starts to detect a person (referred to as "client candidate" hereinafter) who is giving a predetermined signal. This signal is a gesture performed by the person or sound released by the person. The seeking unit 16 uses the information detected by the sensor group 106 to detect the client candidate. In this case, the seeking unit 16 may perform an operation for informing the surroundings that the mobile robot 10 is performing the client seeking process. For example, in a case where the mobile robot 10 has a shape that resembles an animal or human, this operation involves shaking the head to look around the surroundings, turning on a lamp in a blinking manner, or rotating a camera.

In step S62, the seeking unit 16 determines whether a client candidate is detected. If a client candidate is detected (YES in step S62), the seeking unit 16 causes the process to transfer to step S7. If a client candidate is not detected (NO in step S62), the seeking unit 16 causes the process to transfer to step S63.

In step S63, the seeking unit 16 determines whether a predetermined waiting time has elapsed from when the command for the client seeking process is made. If it is determined that the waiting time has not elapsed (NO in step S63), the seeking unit 16 causes the process to transfer to step S62. If it is determined that the waiting time has elapsed (YES in step S63), the seeking unit 16 causes the process to transfer to step S64.

In step S64, the seeking unit 16 notifies the user terminal 20 that the destination region is reached. Upon receiving this notification, the user terminal 20 notifies the user that the mobile robot 10 has reached the destination region. Specifically, the display unit 24 displays a message indicating that the mobile robot 10 has reached the destination region. Alternatively, an audio speaker (not shown) may output predetermined sound. Upon receiving the notification, the user terminal 20 waits for a response from the user. For example, the display unit 24 displays a button, and when the user touches this button, the receiving unit 22 notifies the mobile robot 10 that there is a response from the user.

In step S65, the seeking unit 16 determines whether there is a response from the user, that is, whether notification indicating that there is a response from the user terminal 20 is received. If it is determined that there is a response from the user (YES in step S65), the seeking unit 16 causes the process to transfer to step S62. If it is determined that there is no response from the user (NO in step S65), the seeking unit 16 causes the process to transfer to step S66.

In step S66, the seeking unit 16 deletes, from the storage unit 11, the information related to the call command being processed. Upon deleting the information related to the call command being processed, the seeking unit 16 causes the process to transfer to step S51. Accordingly, the mobile robot 10 starts to move toward a destination region corresponding to a subsequent call command.

Figure 14:
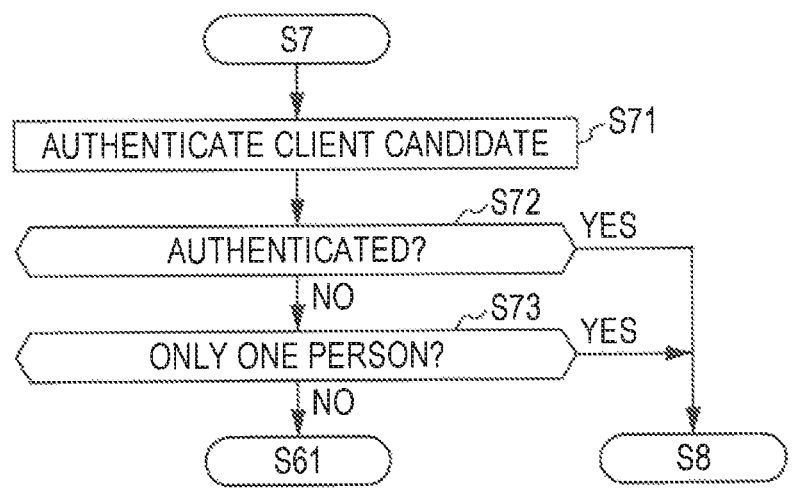
FIG. 14 is a diagram illustrating a detailed example of step S7.

FIG. 14 is a diagram illustrating a detailed example of step S7. In step S71, the authenticating unit 17 authenticates whether the client candidate is the proper client. The term "proper client" refers to the user designated as the receiver of the service by the user who has made the call command and is, for example, the user himself/herself who has made the call command. The user who has made the call command is specified by the user ID stored in the storage unit 11. The client is authenticated based on, for example, face authentication or voice-print authentication. Information used for the authentication is preliminarily registered in the mobile robot 10. This authentication is performed by using, for example, the information detected by the sensor group 106.

In step S72, the authenticating unit 17 determines whether the client candidate is authenticated as being the proper client. If the client candidate is not authenticated as being the proper client (NO in step S72), the authenticating unit 17 causes the process to transfer to step S73. If the client candidate is authenticated as being the proper client (YES in step S72), the authenticating unit 17 causes the process to transfer to step S8.

In step S73, the authenticating unit 17 determines whether there is only one detected person giving the signal. If it is determined that there is only one detected person giving the signal (YES in step S73), the authenticating unit 17 causes the process to transfer to step S8. If it is determined that there is more than one detected person giving the signal (NO in step S73), the authenticating unit 17 causes the process to transfer to step S61.

Figure 15:
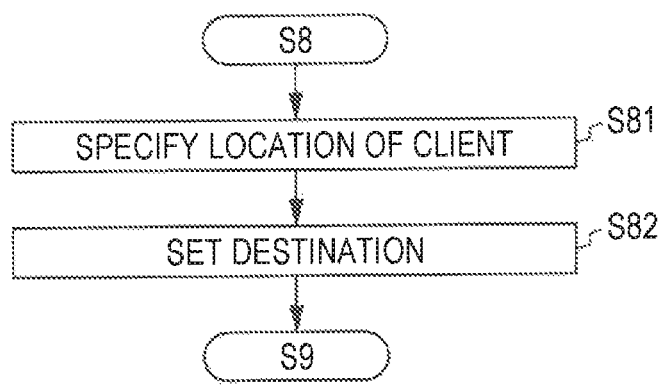
FIG. 15 is a diagram illustrating a detailed example of step S8.

FIG. 15 is a diagram illustrating a detailed example of step S8. In step S81, the seeking unit 16 specifies the location of the client. For example, the location of the client is specified by using the information detected by the sensor group 106. In step S82, the seeking unit 16 sets a destination. The destination is set in accordance with the location of the client specified in step S81. Specifically, for example, on the route from the current location of the mobile robot 10 to the location of the client, the seeking unit 16 sets a location at a predetermined distance to the client as the destination. The seeking unit 16 stores information for specifying the set destination into the storage unit 11.

Figure 16:
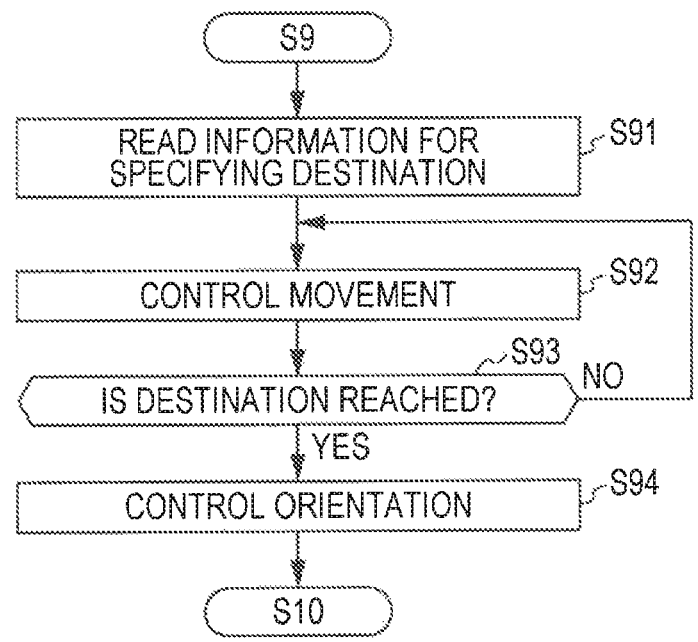
FIG. 16 is a flowchart illustrating a detailed example of step S9.

FIG. 16 is a flowchart illustrating a detailed example of step S9. In step S91, the autonomous-movement control unit 15 reads, from the storage unit 11, the information for specifying the destination. In step S92, the autonomous-movement control unit 15 controls the moving unit 14 so as to move toward the read destination. In other words, in this example, the moving unit 14 is stopped from moving during the client seeking process in step S6. In step S93, the autonomous-movement control unit 15 determines whether the set destination is reached. If it is determined that the destination is reached (NO in step S93), the autonomous-movement control unit 15 causes the process to transfer to step S92. If it is determined that the destination is reached (YES in step S93), the autonomous-movement control unit 15 causes the process to transfer to step S94.

In step S94, the autonomous-movement control unit 15 controls the moving unit 14 so that the orientation of the service unit 150 relative to the client is set in a predetermined orientation. The term "predetermined orientation"

used here refers to an orientation suitable for providing a service by the service unit 150, such as an orientation in which an opening for taking out a coffee cup is open.

Figure 17:
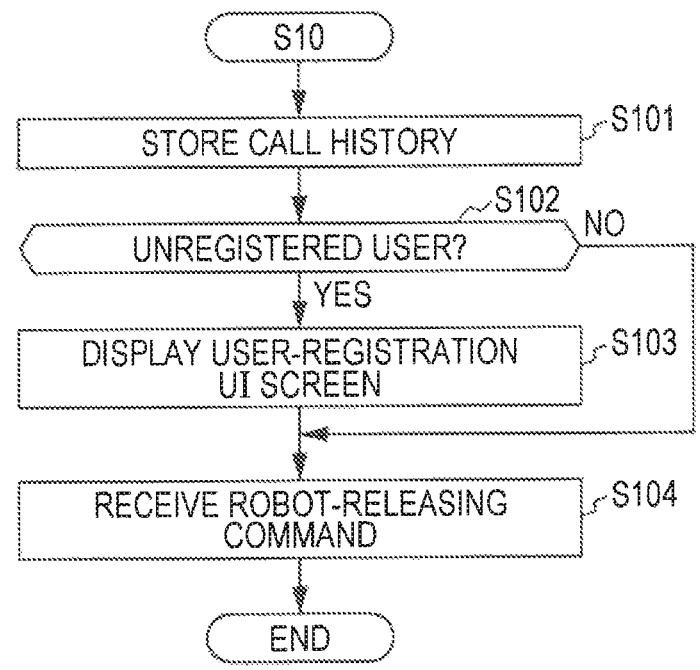
FIG. 17 is a flowchart illustrating a detailed example of step S10.

FIG. 17 is a flowchart illustrating detailed example of step S10. In step S101, the receiving unit 22 stores a call history into the storage unit 11. The call history is call-history-related information and includes, for example, information indicating user IDs, the coordinates of destinations, and provided services. In step S102, the receiving unit 22 determines whether the client is an unregistered user. If it is determined that the client is an unregistered are user (YES in step S102), the receiving unit 22 proceeds to step S103 to cause the display unit 24 to display a UI screen that prompts the client to register the information used in the authentication (e.g., an image of the face of the client in the case of face authentication). In accordance with an operation performed on this UI screen by the user, the receiving unit 22 stores the information used in the authentication into the storage unit 11. If it is determined that the client is a registered user (NO in step S102), the receiving unit 22 causes the process to transfer to step S104.

In step S104, the receiving unit 22 receives a robot-releasing command (indicating that the service is completely provided) from the user. When the robot-releasing command is received, the receiving unit 22 causes the process to transfer to step S1.

According to this exemplary embodiment, the mobile robot 10 moves toward the client even when it is difficult to acquire a specific location of the destination or even when the destination changes after the service is requested.

3. Modifications

The exemplary embodiment of the present invention is not limited to that described above and permits various modifications. Some modifications will be described below. Of the following modifications, two or more thereof may be combined.

3.1. First Modification

The method by which the receiving unit 22 receives designation of a destination region is not limited to that described in the exemplary embodiment. For example, the designation of the destination region may be received by allowing the user to perform a so-called drag-and-drop operation on the object 93 in the UI screen in FIG. 6. Alternatively, the receiving unit 22 may receive the designation of the destination region based on a text input or an audio input of information for specifying the destination region (e.g., "room 201 on the second floor"). As another alternative, the receiving unit 22 may receive designation of the size of the destination region in addition to the coordinates of the representative point of the destination region.

3.2. Second Modification

The method by which the receiving unit 12 receives designation of a destination region is not limited to that described in the exemplary embodiment. The receiving unit 12 may receive the designation of the destination region without the intervention of the user terminal 20 by using the information detected by the sensor group 106. For example, if a predetermined signal is detected via the sensor group 106, the receiving unit 12 may receive the signal as the designation of the destination region. This signal is, for example, a gesture performed by a person or sound released by the person. If the person's action or word detected by the sensor group 106 matches the action or word preliminarily stored in the storage unit 11, the receiving unit 12 specifies the direction and the distance to the person making the action or the person releasing the voice. The receiving unit 12 superposes the location of the mobile robot 10 (or the location of the sensor group 106) and the specified direction and distance onto the map data stored in the storage unit 11 so as to specify the destination region.

3.3. Third Modification

The timing at which the seeking unit 16 starts to perform the client seeking process is not limited to that described in the exemplary embodiment. The seeking unit 16 may start to perform the client seeking process before the mobile robot 10 reaches the destination region. For example, due to the characteristics of the sensor group 106, the seeking unit 16 has a limit distance within which a signal from a person is detectable. The seeking unit 16 may tart to perform the client seeking process when (i.e., after) the distance from the mobile robot 10 to the outer periphery of the destination region becomes smaller than this limit distance.

3.4. Fourth Modification

The moving unit 14 does not have to be stopped from moving while the seeking unit 16 is performing the client seeking process. The seeking unit 16 may perform the client seeking process while moving (i.e., in a state where the moving unit 14 continues to move).

3.5. Fifth Modification

The division of functions among the multiple units included in the movement control system 1 is not limited to that illustrated in FIG. 1. For example, instead of the mobile robot 10, the user terminal 20 may have at least one of the functions of the storage unit 11, the searching unit 13, the autonomous-movement control unit 15, and the seeking unit 16. More specifically, the user terminal 20 may perform the route searching process in addition to the destination-region setting process.

Figure 18:
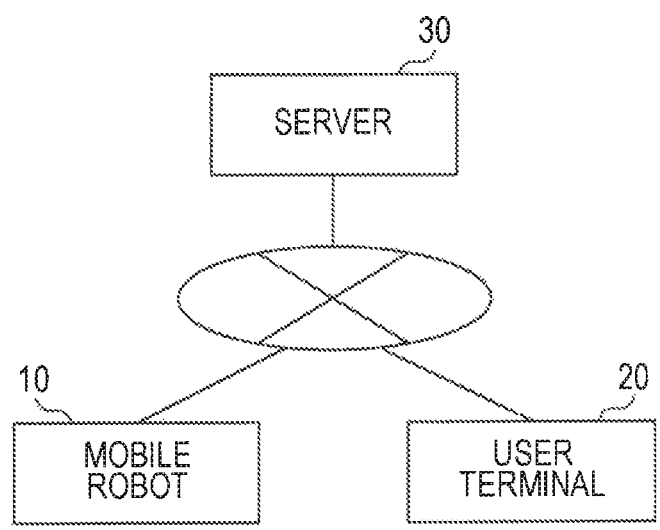
FIG. 18 illustrates the system configuration of a movement control system according to a fifth modification.

FIG. 18 illustrates the system configuration of the movement control system 1 according to a fifth modification. In this example, the movement control system 1 has a server 30. The server 30 is a computer (i.e., so-called cloud) having a processor, a memory, a storage device, and a communication IF (which are not shown). The server 30 is connected to the mobile robot 10 and the user terminal 20 via a network. In this example, one or more of the functions of the movement control system 1 may be implemented in the server 30. For example, the server 30 may have at least one of the storage unit 11, the receiving unit 12, the searching unit 13, the autonomous-movement control unit 15, the seeking unit 16, and the authenticating unit 17.

In the example in FIG. 18, the mobile robot 10 and the user terminal 20 may be connected to each other via the network and the server 30 instead of being directly connected to each other by Bluetooth or Wi-Fi.

In the case where the movement control system 1 has the server 30 as in the fifth modification, if there are multiple mobile robots as in FIG. 7, the server 30 may manage the location of each mobile robot. Specifically, the server 30 periodically communicates with each mobile robot so as to acquire the current location of each mobile robot. The server 30 stores the acquired current location of each mobile robot into the storage device together with an identifier of that mobile robot. When an inquiry from a user terminal 20 is received, the server 30 transmits data for displaying the UI screen shown in FIG. 7 to the user terminal 20. The server 30 stores information for specifying a service usable by each user. When generating the data for displaying the UI screen, the server 30 generates data of a UI screen that includes an image object corresponding to a mobile robot that provides a service usable by that user. Even in the case where the movement control system 1 has the server 30, the management of usable services may be performed by individual user terminals 20.

3.6. Sixth Modification

Although the exemplary embodiment described above relates to an example in which the person making the call command is the same as the person (client) receiving the service, the person making the call command and the person receiving the service do not have to be the same. For example, a subordinate (i.e., the person making the call command) may command the mobile robot 10 to provide coffee to his/her boss (i.e., the person receiving the service). In this case, the call command transmitted from the user terminal 20 to the mobile robot 10 may include the user ID of the person receiving the service.

3.7. Seventh Modification

The mobile robot 10 may have an operation mode in which it moves along a predetermined route at a predetermined speed (referred to as "cruising mode" hereinafter). The mobile robot 10 performs the client seeking process while moving along the predetermined route. In this case, the client seeking process is performed within a predetermined distance (e.g., 8 m) from the mobile robot 10. If the location of the client specified as a result of the seeking process is not on the cruising route, the mobile robot 10 temporarily deviates from the cruising route and moves toward the client. Supposing that a call command is received from a location farther than this predetermined distance, the mobile robot 10 does not deviate from the cruising route nor increase the predetermined speed. The mobile robot 10 receives the call command again within the predetermined distance. Alternatively, the mobile robot 10 stores the rough location, the physical appearance, or the face of the client who has made the call command from a far location. When the client enters a predetermined distance range, if the client is not on the route, the mobile robot 10 moves toward the client by deviating from the route within the predetermined distance range. The expression "the client or the location of the client is not on the route" refers to a state where the client or the location of the client is not on a passage serving as the cruising route. The mobile robot 10 may provide notification of the predetermined route to a user who may possibly be the client by using, for example, an electronic mail, or may display the notification on, for example, a digital sign board (not shown).

In the case where the mobile robot 10 operates in the cruising mode, a client would give a signal as a call command when the mobile robot 10 enters a predetermined distance range from the location of the client. A user informed of the cruising route expects that the mobile robot 10 may cruise along that route. Greatly changing the cruising route beyond the predetermined distance as a result of receiving a call command from a location farther than the predetermined distance may disappoint other clients. Therefore, it is desirable that the mobile robot 10 not change the cruising route beyond the predetermined distance. However, the mobile robot 10 may change the cruising route if the surroundings of the mobile robot 10 are informed that the cruising route will be changed beyond the predetermined distance. For example, even in the case where the mobile robot 10 is operating in the cruising mode, if the receiving unit 12 receives a call command from a location farther than the predetermined distance and the mobile robot 10 is to deviate from the cruising route in accordance with that command, the mobile robot 10 uses a lighting unit, a display unit, or an audio unit attached thereto so as to inform the surroundings of the mobile robot 10 that the mobile robot 10 will deviate from the cruising route.

3.8. Eighth Modification

If vibration of a predetermined level or higher is detected due to a step or an irregular surface on the route while the mobile robot 10 is moving, the autonomous-movement control unit 15 may store this information in correspondence with the map data in the storage unit 11 and avoid this route from next time and onward.

3.9. Ninth Modification

The mobile robot 10 may indicate its own state to the surroundings. Specifically, the state of the mobile robot 10 may be indicated by being displayed on a display unit provided in the mobile robot 10, by being expressed with light, or by using sound. Examples of the state of the mobile robot 10 include a state where a call command is receivable, a state where the mobile robot 10 is moving in response to a received call command, a state where the mobile robot 10 operating in the cruising mode, and a state where the mobile robot 10 is providing a service. Moreover, the state of the mobile robot 10 may also include a specific destination or client's name.

3.10. Tenth Modification

After reaching the destination region, the mobile robot 10 may perform a predetermined operation for informing the surroundings that it is waiting for a signal. The predetermined operation may be, for example, shaking the head, inquiring about the name and the location of the client as in "where is Mr./Ms. (client's name)?", causing a display unit provided in the mobile robot 10 to display such an inquiry, transmitting an inquiry to the client's user terminal (i.e., a mobile terminal or a personal computer), or emitting light having a color or pattern indicating a predetermined inquiry. The operation for informing the surroundings that the mobile robot 10 is waiting for a signal may be performed before it reaches the destination region at a location distant from the center or the outer periphery of the destination region by a predetermined distance.

3.11. Eleventh Modification

Upon moving to a destination, if a client is not within a predetermined distance or there are multiple client candidates, the seeking unit 16 may perform the client seeking process again.

3.12. Other Modifications

The hardware configuration for realizing the functions in FIG. 1 is not limited to that described in the exemplary embodiment. For example, the driving system 105 may have a component that resembles a caterpillar or the extremities of an animal or human in addition to or in place of the wheels and the tires. In another example, the driving system 105 may have a mechanism, such as a propeller, for moving through the air. Furthermore, although the single CPU 101 has the functions of the receiving unit 12, the searching unit 13, the autonomous-movement control unit 15, the seeking unit 16, and the authenticating unit 17 in the exemplary embodiment, at least one of these functions may be implemented in a dedicated processor.

At least one of the functional components shown in FIG. 1 may be omitted. For example, the authenticating unit 17 may be omitted. Moreover, with regard to the order of the flow shown in FIGS. 4, 5, 9, and 12 to 17, one or more of the steps may be interchanged or omitted.

The program executed by the CPU 101 or the CPU 201 in the exemplary embodiment may be provided by a storage medium, such as an optical disk, a magnetic disk, or a semiconductor memory, or may be downloaded via a communication line, such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A mobile robot comprising:
    a receiving unit configured to receive designation of a destination region including a destination;
    a moving unit configured to move toward the destination region;
    a seeking unit configured to seek a client after movement toward the destination region starts, wherein the seeking unit is configured to specify a person giving a predetermined signal as the client;
    a searching unit configured to search for a route toward the destination region; and
    an authenticating unit configured to authenticate whether the person giving the signal is a proper client, wherein
    the moving unit is configured to move toward the sought client and to move along the route searched by the searching unit, and
    in a case where the person giving the signal is authenticated as the proper client, the seeking unit specifies the person as the client.

2. The mobile robot according to claim 1, wherein
the seeking unit is configured to specify as the client the person giving the signal as a gesture performed by the person or a sound released by the person.

3. The mobile robot according to claim 1, wherein
the seeking unit is configured to seek the client after moving to within the destination region.

4. The mobile robot according to claim 3, wherein,
after moving to within the destination region, the seeking unit seeks the client in a state where the movement is stopped.

5. The mobile robot according to claim 1, wherein
the seeking unit is configured to seek the client while moving toward the destination region.

6. The mobile robot according to claim 1, wherein
the seeking unit has a limit distance within which the signal is detectable, and is configured to seek the client after a distance to the destination region becomes smaller than the limit distance.

7. The mobile robot according to claim 1, wherein
the receiving unit is configured to receive the designation of the destination region received by a user terminal.

8. The mobile robot according to claim 7, wherein
the receiving unit is configured to receive the designation of the destination region on a predetermined map.

9. The mobile robot according to claim 8, wherein
the destination region has a predetermined size with a point designated on the map as a center.

10. The mobile robot according to claim 1, wherein,
in a case where the searching unit detects a plurality of routes toward the destination region, the moving unit moves along one of the plurality of routes with a shortest distance to an outer periphery of the destination region.

11. The mobile robot according to claim 1, further comprising:
    a memory configured to store a map having recorded therein a region in which the moving unit is movable, wherein,
    in a case where the destination region includes a plurality of regions in which the moving unit is movable, the moving unit moves toward one of the plurality of regions that overlaps a region close to a center of the destination region.

12. The mobile robot according to claim 1, further comprising:
    a providing unit configured to provide a predetermined service after moving to a location corresponding to the client.

13. A movement control system comprising:
    a receiving unit configured to receive designation of a destination region including a destination;
    a moving unit configured to move toward the destination region;
    a seeking unit configured to seek a client after movement toward the destination region starts, wherein the seeking unit is configured to specify a person giving a predetermined signal as the client;
    a searching unit configured to search for a route toward the destination region; and
    an authenticating unit configured to authenticate whether the person giving the signal is the proper client, wherein
    the moving unit is configured to move toward the sought client and to move along the route searched by the searching unit, and
    in a case where the person giving the signal is authenticated as the proper client, the seeking unit specifies the person as the client.

14. A movement control method comprising:
    receiving a designation of a destination region including a destination;
    moving toward the destination region;
    seeking a client after the moving toward the destination region starts, wherein the seeking includes specifying a person giving a predetermined signal as the client;
    searching for a route toward the destination region; and
    authenticating whether the person giving the signal is a proper client, wherein the moving includes moving toward the sought client and moving along the searched route, and in a case where the person giving the signal is authenticated as the proper client, the seeking includes specifying the person as the client.

15. A mobile robot comprising:

a receiving unit configured to receive designation of a destination region including a destination;

a moving unit configured to move toward the destination region;

a seeking unit configured to seek a client after movement toward the destination region starts; and a searching unit configured to search for a route toward the destination region, wherein the moving unit is configured to move toward the sought client and to move along the route searched by the searching unit, the seeking unit is configured to specify a person giving a predetermined signal as the client, and the seeking unit has a limit distance within which the signal is detectable, and seeks the client after a distance to the destination region becomes smaller than the limit distance.

* * * * *